United States Patent
Maess et al.

(10) Patent No.: US 6,433,804 B1
(45) Date of Patent: Aug. 13, 2002

(54) METHOD FOR PRINTING BY USING A MULTILEVEL CHARACTER GENERATOR AND PRINTING DEVICE

(75) Inventors: Volkhard Maess, Erding; Martin Schleusener, Zorneding, both of (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/868,829

(22) PCT Filed: Dec. 21, 1999

(86) PCT No.: PCT/EP99/10244

§ 371 (c)(1),
(2), (4) Date: Jun. 21, 2001

(87) PCT Pub. No.: WO00/38018

PCT Pub. Date: Jun. 29, 2000

(30) Foreign Application Priority Data

Dec. 21, 1998 (DE) .......................... 198 59 094

(51) Int. Cl.⁷ ..................... G03G 15/04; G03G 15/00
(52) U.S. Cl. ..................... 347/132; 347/133; 399/51
(58) Field of Search ................... 347/129, 130, 347/131, 132, 133, 140; 399/48, 51; 358/298

(56) References Cited

U.S. PATENT DOCUMENTS

| | | | |
|---|---|---|---|
| 4,709,250 A | | 11/1987 | Takeuchi |
| 4,794,413 A | * | 12/1988 | Yamazaki et al. .......... 347/247 |
| 4,855,766 A | * | 8/1989 | Suzuki et al. .............. 347/133 |
| 5,153,609 A | * | 10/1992 | Ando et al. ................ 347/129 |
| 5,309,177 A | * | 5/1994 | Shoji et al. ................ 347/131 |
| 5,367,361 A | * | 11/1994 | Henderson .................. 399/31 |
| 5,767,888 A | | 6/1998 | Schleusener et al. ....... 347/130 |
| 6,167,210 A | * | 12/2000 | Maess et al. ................ 399/46 |

FOREIGN PATENT DOCUMENTS

| | | |
|---|---|---|
| DE | 37 27 808 A1 | 2/1988 |
| EP | 0 275 254 B2 | 7/1994 |
| WO | WO 97/37285 | 10/1997 |

* cited by examiner

*Primary Examiner*—Joan Pendegrass
(74) *Attorney, Agent, or Firm*—Schiff Hardin & Waite

(57) ABSTRACT

A method in which a multilevel character generator (22) is adjusted using a single correction factor (KF) during an automatic compensation operation such that high-quality printed images can be obtained also in the instance of modified printing conditions.

16 Claims, 4 Drawing Sheets

$$V_D(K,T,H) := (V_C - V_{LIM}) \cdot \exp(-K \cdot T \cdot H) + V_{LIM} \qquad [1]$$

$$K(V_D,T,H) := \frac{1}{T \cdot H} \cdot \ln\left[\frac{V_C - V_{LIM}}{V_D - V_{LIM}}\right] \qquad [2]$$

$$H(V_D,K,T) := \frac{1}{T \cdot K} \cdot \ln\left[\frac{V_C - V_{LIM}}{V_D - V_{LIM}}\right] \qquad [3]$$

$V_C$: photoconductor charge potential in V
$V_D$: photoconductor discharge potential in V
$V_{LIM}$: lowest obtainable discharge potential in V
H: illumination in μWs/cm²
T: photoconductor temperature · in °C
K: photoconductor sensitivity factor in cm²/(μWs ·°C)

Fig.4

METHOD FOR PRINTING BY USING A MULTILEVEL CHARACTER GENERATOR AND PRINTING DEVICE

BACKGROUND OF THE INVENTION

1. Field of the Invention

The present invention is directed to a method for printing with a multi-level character generator. The invention is also directed to a printer device that is explained in greater detail below.

2. Description of the Related Art

A method is known wherein an optical character generator illuminates a photoconductor with at least one light source. Light encoding data that respectively contain one of at least three different light encoding values are generated from print data of a print image. The light encoding values are respectively allocated to a different illumination energy value with which the character generator illuminates the photoconductor.

In contrast to traditional bi-level character generators, character generators driven with more than two light encoding values are referred to as multi-level character generators. Although there are more than two light encoding values given multi-level character generators, there are ultimately only printed or non-printed surfaces. Compared to bi-level character generators, however, multi-level character generators offer the possibility of designationally defining the size of the charge regions and, thus, of the pixels (picture elements) in order to produce the impression of different gray scale values for someone who views the developed charge image. Such a multi-level character generator is disclosed by U.S. Pat. No. 5,767,888.

What is disadvantageous about the known printing with multi-level character generators is that the quality is reduced given changing printing conditions. For example, these printing conditions include the increasing age of the photoconductor and changes in the quality of the toner or, respectively, developer. Methods with which print images having good quality can be printed even given modified printing conditions are employed for printers with bi-level character generators, see, for example, the balancing method set forth in Published International Patent Application WO 97/37285.

Given LED character generators, moreover, auxiliary parameters with whose assistance manufacture-conditioned deviations in the light emission of the individual LEDs are compensated is usually prescribed for each LED. All LEDs therefore emit the same illumination energy given the same light encoding value. Such a balancing is disclosed, for example, in European Patent EP 0 275 254 B1.

German Published Application DE 37 27 808 A1 discloses an image recording device wherein topical deviations of the sensitivity of a photoconductor are determined by comparison to a reference potential and are subsequently corrected. The correction ensues topically dependent with different correction quantities when printing various regions of the print image.

U.S. Pat. No. 4,709,250 discloses a method for printing with the assistance of a character generator. The potential V is acquired at a given balance illumination energy, whereby the balance illumination energy derives from the current intensity flowing through the laser or LED together with the illumination time on the photoconductor. The acquired potential V is compared to a reference potential. The illumination energy values are modified on the basis of this comparison.

SUMMARY OF THE INVENTION

An object of the present invention is to provide a method for the operation of an electrophotographic printer or copier device with multi-level character generation that makes it possible to generate print images having high print quality even given changing printing conditions. Further, a printer device with which the method can be implemented is provided.

The objects of the invention are achieved by a method for printing with a character generator, whereby an optical character generator illuminates a photoconductor with at least one light source, light encoding data are generated from print data of a print image, the light encoding data respectively contain one of at least three different light encoding values that are allocated to different illumination energy values, a balance potential to be set on the photoconductor is prescribed for a balance event, the illumination energy producing the prescribed balance potential on the photoconductor is acquired as balance illumination energy, and whereby the illumination energy values to be generated by the character generator given the various light encoding values are modified in the same relationship dependent on the acquired balance illumination energy, whereby the degree of the modification is determined by the deviation of the balance illumination energy from a reference illumination energy that generates the balance potential given employment of a reference photoconductor with a predetermined discharge characteristic.

In a preferred embodiment, a correction factor is determined that is a criterion for the deviation of the current characteristic of the photoconductor from the predetermined discharge characteristic; and the illumination energy values are modified with the assistance of the correction factor. Specifically, the amount of the balance potential or, respectively, of the acquired balance potential deviates by less than 100 V from the amount of the discharge potential of the photoconductor. The amount of the predetermined balance potential or, respectively, of the acquired balance potential of a preferred embodiment lies no more than 50 Volts from the average of the amount of the discharge potential of the photoconductor and the amount of the discharge potential. The correction factor for setting the character generator is determined preferably by division from the acquired balance illumination energy and the reference illumination energy or, respectively, from the acquired balance potential and the reference potential. The acquired balance illumination energy or, respectively, the acquired balance potential may be employed as a correction factor for the setting of the character generator. A current for the drive of the light sources or, respectively, of the light sources of the character generator or their on duration is modified dependent on the correction factor. An approximation for the characteristic of the photoconductor is preferably employed for determining the deviation or for determining the correction factor. The following approximation is employed:

$$VD(K,T,H) = (VC-VLIM) \cdot \exp(-K \cdot T \cdot H) + VLIM, \qquad (1)$$

whereby

VC is the charge potential of the photoconductor in volts,

VD is the discharge potential of the photoconductor in volts,

VLIM is the lowest obtainable discharge potential in volts,

H is the illumination energy in $\mu Ws/cm2$,

T is the currently acquired temperature of the photoconductor in ° C.,

K is the photoconductor class in cm2/($\mu$Ws° C.), and exp is the exponential function.

In one aspect of the invention, the balancing event is automatically implemented, preferably after a printer or, respectively, copier device is turned on and/or after longer printing pauses and/or after longer printer operation and/or on demand of an operator. A further feature provides that the discharge characteristic of the reference photoconductor is permanently prescribed, particularly independently of modifications due to aging or modified ambient conditions in the printing process.

The present invention also provides a printer or copier device, particularly for the implementation of the preceding methods, including a print data unit that generates light encoding data having respectively one of at least three different light encoding values from print data of a print image, a multi-level character generator that is driven with the light encoding data and emits a predetermined illumination energy dependent on the respective light encoding value, and a photoconductor that is discharged by the illumination energy output by the character generator, whereby a balancing device is provided that, in an automatic balance event, modifies the illumination energies emitted by the character generator at different light encoding values in the same relationship, means are provided for the balance event in order to prescribe a balance potential to be set on the photoconductor, means are provided that acquire the illumination energy producing the predetermined balance potential on the photoconductor as balance illumination energy, the illumination energy values to be generated by the same generator given the various light encoding values are modified by the balance device in the same relationship dependent on the acquired balance illumination energy, and whereby the degree of the modification is determined by the deviation of the balance illumination energy from a reference illumination energy that generates the balance potential given employment of a reference photoconductor with a predetermined discharge characteristic.

The invention is based on the perception that, due to the incomplete linear characteristic of the photoconductor, the illumination energy is actually to be individually balanced for each light encoding value in the balancing of a multi-level character generator. However, there is also an adequately exact balancing for many applications when a common balancing procedure is implemented for the illumination energies of the different light encoding values. In the inventive method, the illumination energies generated given the different light encoding values are therefore modified in the same relationship. Most of the light encoding values have illumination energies that lie on a linear region of the photoconductor characteristic, so that the illumination energies for the different light encoding values can be set with adequate precision as a result of the correction ensuing in the same relationship.

Given the method of the invention, a balancing potential to be set on the photoconductor is prescribed for the balancing event. Subsequently, the illumination energy that produces the predetermined balancing potential on the photoconductor is acquired and a balanced illumination energy determined. Dependent on the acquired balance illumination energy, the illumination energy values to be generated by the character generator given the various light encoding values are modified in the same relationship.

The extent of the modification is determined by the deviation of the balance illumination energy from a reference illumination energy. The reference illumination energy is the illumination energy that generates the balance potential given employment of a reference photoconductor with a predetermined discharge characteristic. The discharge characteristic indicates the relationship of illumination and potential. The reference photoconductor, for example, is a photoconductor in a new printer device that is operated at 20° C. room temperature.

In the inventive method, the illumination energy values generated by the character generator at the different light encoding values are modified in the same relationship relative to one another and are thus reset. The inventive method is simple because all illumination energies are modified in the same relationship. Nonetheless, print images having a print quality that is sufficient for many purposes derive. The higher print quality that can be achieved given a multi-level character generator compared to a bi-level character generator is also assured unmodified by the inventive method when the properties of the photoconductor and/or of the electrographic development system change.

In one development, a correction factor is determined that is a criterion for the deviation of the current characteristic of the photoconductor from the predetermined discharge characteristic. The illumination energies are then modified in a simple way with the assistance of the correction factor. This ensues in that, for example, the illumination energy value predetermined for each light encoding value is multiplied by the correction factor.

In another development of the inventive method, the amount of the predetermined or, respectively, acquired balance potential deviates by less than 100 V from the amount of the discharge potential of the photoconductor. For example, the amount of the balance potential lies only slightly above what is the lowest discharge potential in terms of amount. In other words, the discharge potential is the potential that is established on the photoconductor when the photoconductor is completely discharged. Given certain photoconductors, the discharge potential is relatively independent of the printing conditions. For example, it hardly changes with increasing age of the photoconductor or with different temperature. The discharge potential is therefore especially well-suited for identifying the balance illumination energy.

In an alternative development of the inventive method, the amount of the predetermined balance potential lies roughly at the average from the amount of the charge potential of the photoconductor and the amount of the discharge potential and thus lies in the linear region of the photoconductor characteristic. In particular, only this linear part of the photoconductor characteristic is employed in the printing given high-speed printing.

In a next development, the correction factor is determined by division of the acquired balance illumination energy by the reference illumination energy. Alternatively, however, the acquired balance illumination energy or, respectively, the acquired balance potential can also be immediately used as a correction factor for the character generator.

In one development, an approximation for the characteristic of the photoconductor is employed for the determination of the illumination energies to be emitted by the character generator. The involvement of the characteristic makes it possible to implement only a single measurement at the photoconductor. For a predetermined illumination energy, for example, the potential occurring given an illumination of the photoconductor with this illumination energy is measured. Subsequently, the balance illumination energy belonging to the predetermined balance potential or, respectively, the balance potential belonging to the predetermined balance illumination energy is determined from the characteristic, which changes with the printing conditions.

The balancing event is automatically implemented. This preferably ensues after a printer or, respectively, copier device is turned on, after longer printing pauses, after a longer printing operation and/or on demand of an operator. These measures assure that modifications of the photoconductor due to aging or due to altered ambient conditions are taken into consideration in the printing process.

In one development, the illumination energy values are modified in the same relationship both with respect to one another as well as for picture elements. The correction thus identically influences all picture elements.

The invention is also directed to a printer or, respectively, copier device that, in particular, is employed for the implementation of the inventive methods or, respectively, their developments. The aforementioned technical effects thus also apply to the inventive printer or, respectively, copied device.

BRIEF DESCRIPTION OF THE DRAWINGS

Exemplary embodiments of the invention are explained below on the basis of the attached drawings.

FIG. 4 is a list of equations for the approximation of a photoconductor characteristic.

DETAILED DESCRIPTION OF THE PREFERRED EMBODIMENTS

Figure 1:
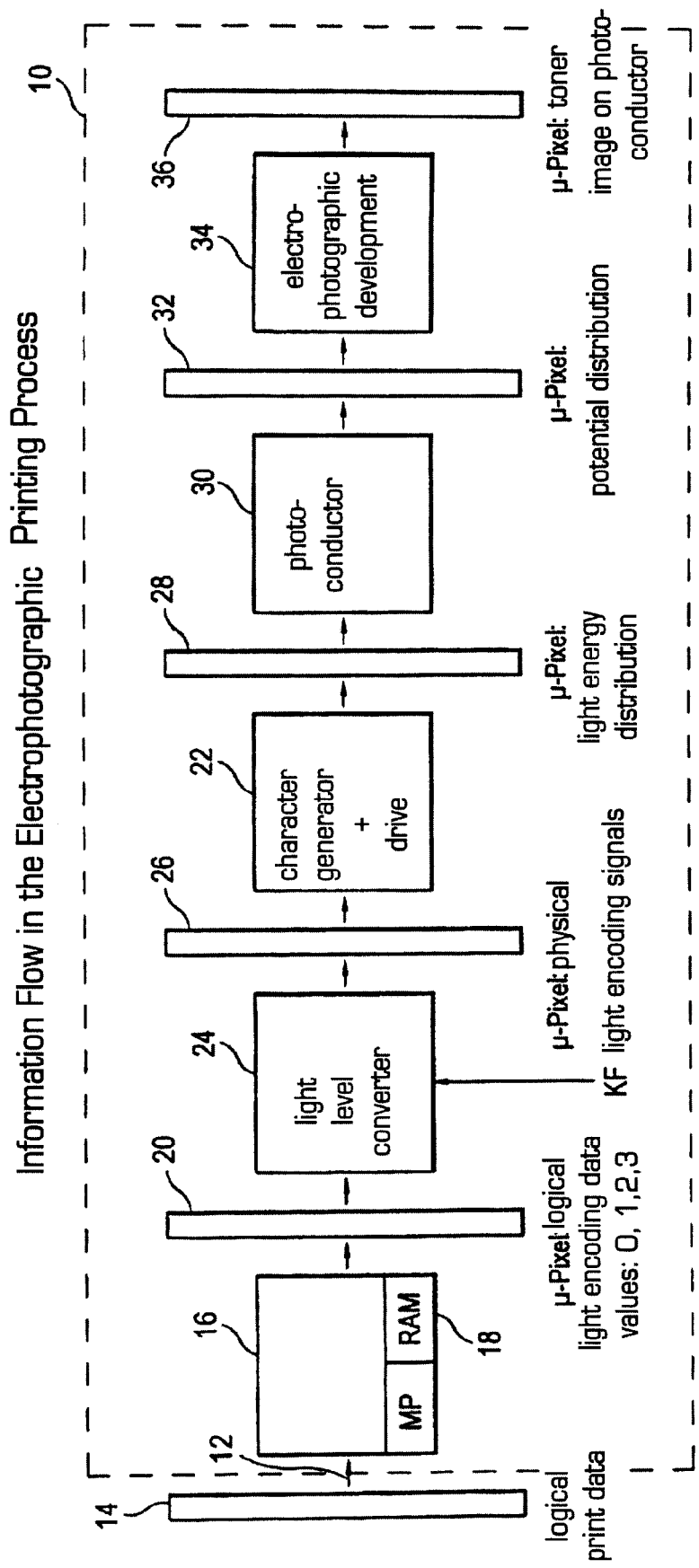
FIG. 1 is a schematic illustration of a printing event in block diagram.
Figure 2:
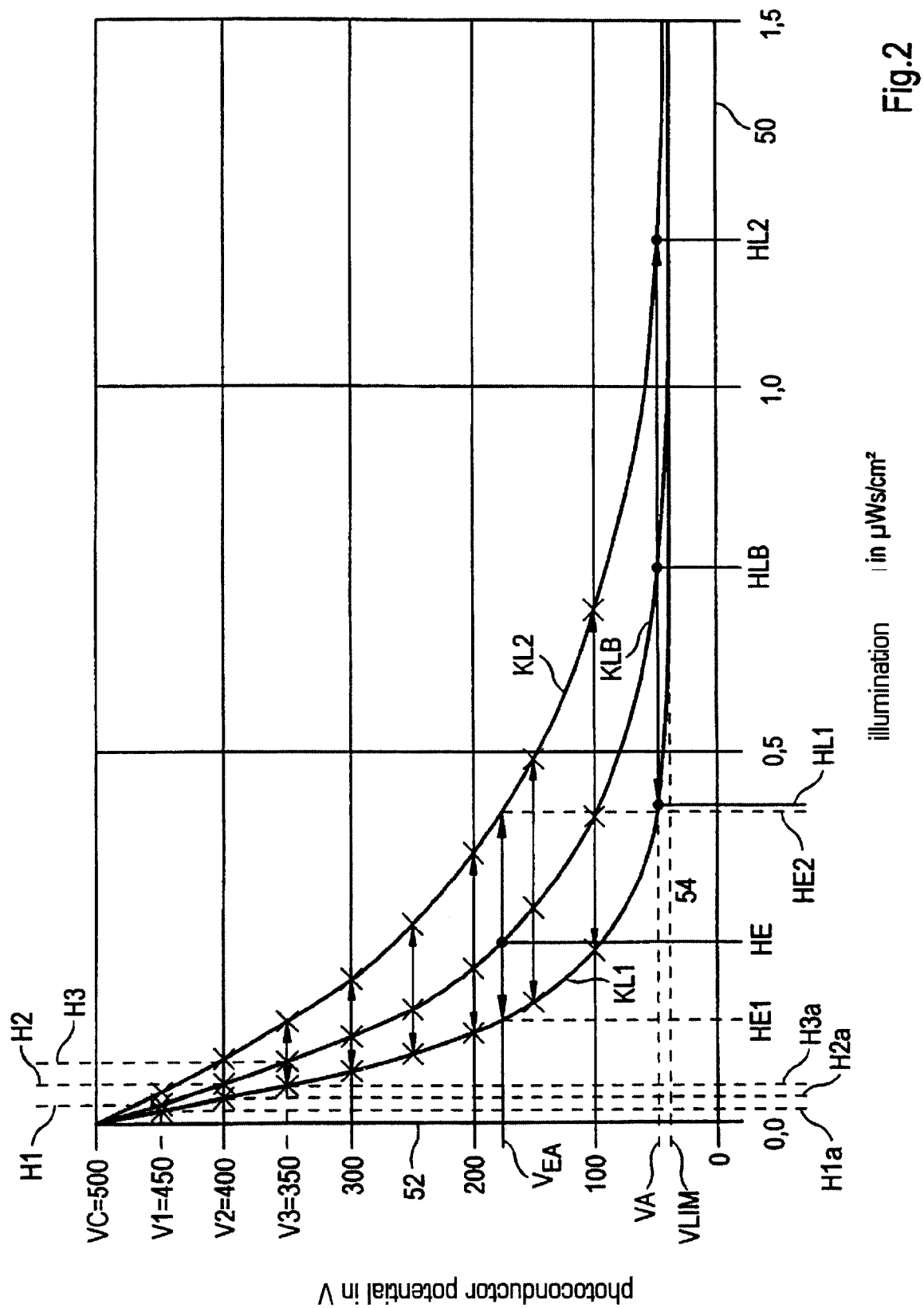
FIG. 2 is a graph showing a potential/illumination energy diagram.

FIG. 1 shows a schematic illustration of a printing event as well as the information flow when printing in an electrophotographic printer device 10. Print data 14 are input in the printer 10 via an electronic interface 12. The print data 14 define a print image, for example according to the known postscript format. A print data unit 16 contains a microprocessor MP that processes a conversion program stored in a memory 18. The print data unit 16 generates light encoding data 20 for the individual LEDs (light-emitting diode) of a character generator 22 from the print data 14. The light encoding data 20 are respectively stored in two bits of a data word. There are thus four light encoding values 0, 1, 2 and 3. No illumination is carried out given the light encoding value 0. Given the light encoding value 1, an illumination energy H1 is emitted by the appertaining LED of the character generator 22 when the printer device 10 prints under predetermined printing conditions in a reference printing event characterized by these printing conditions. The light encoding value 2 or, respectively, 3 leads to illumination energies H2 or, respectively, H3 in the reference printing event. The illumination energies H1, H2 and H3 have ascending values in this sequence and are shown in FIG. 2.

The light encoding data 20 are processed in a conversion and correction unit 24 that is constructed essentially like the assembly shown in FIG. 12 of U.S. Pat. No. 5,767,888. Before the beginning of the printing event, a correction factor KF is set at the conversion and correction unit 24 in that the correction factor KF is respectively multiplied by the auxiliary parameters D1 through D64 shown in FIG. 12 of U.S. Pat. No. 5,767,888 that serve for the compensation of the manufacture-conditioned brightness fluctuations of the LEDs. The products that thereby derive are employed instead of the values D1 through D64. The method steps to be implemented for the determination of the correction factor KF are explained in greater detail below on the basis of FIG. 2.

A light signal 26 is determined in the conversion and correction unit 24 dependent on the light encoding value of the respectively processed light encoding datum and dependent on the correction factor KF. Given the light encoding value 0, a light encoding signal 26 is generated that leads to no illumination by the appertaining LED. Given the light encoding value 1, a light encoding signal 26 is generated that—taking the correction factor KF into consideration—effects an illumination with a corrected illumination energy H1a. Given the light encoding value 2 or, respectively, 3, a light encoding signal 26 is generated that—taking the correction factor KF into consideration—leads to an illumination with a corrected illumination energy H2a or, respectively, H3a.

The light encoding signals 26 are employed for the drive of the character generator 22. The character generator 22 contains a drive circuit for the LEDs of an LED line (not shown). Such a drive circuit is disclosed by U.S. Pat. No. 5,767,888. The LEDs of the LED line have a spacing of approximately 42 $\mu$m from one another. What are referred to as macro-cells are respectively generated by three LEDs arranged sequentially when illuminating three successive lines. Light energy distributions 28 emitted by the LEDs of a macro-cell partially superimpose on one another. Given a suitable selection of the light encoding values, light distribution increases that lead to a distribution 32 of potential on a photoconductor 30 similar to the respective light distribution arise within a macro-cell. What is achieved by defining a threshold of potential in a developing unit 34 is that toner regions 36 whose diameters are dependent on the fashioning of the respective potential distribution form in the macro-cells. A half-tone image is thus generated in a simple way by employing the light encoding values. This procedure, including the character generator 22 employed therein as well as the term "macro-cell", is set forth in detail in U.S. Pat. No. 5,767,888, which is a constituent part of the disclosure of the present application and is incorporated by reference herein.

FIG. 2 shows a potential/illumination energy diagram on whose abscissa axis 50 the illumination energy is shown in $\mu$Ws/cm$^2$ and on whose ordinate axis 52 the photoconductor potential is shown in volts. Before the beginning of the illumination, the photoconductor is charged to a charge potential VC of 500 V. A reference characteristic KLB shows the relationship of potential on the photoconductor and illumination energy for a reference photoconductor that is employed in the reference printing event. A characteristic KL1 of a photoconductor employed for printing at the moment deviates from the reference characteristic KLB. The deviations of the characteristics KLB and KL1 are to be attributed, for example, to the temperature or to the age of the photoconductor. Deviations of the characteristics KLB and KL1, however, also arise given a change of the photoconductor or, respectively, when comparing the photoconductors of two different printers. In this case, manufacture-conditioned fluctuations as well as the quality of the photoconductors have an additional influence on the deviation of the characteristics KLB and KL1.

A further characteristic KL2 shows the dependency of the potential on a third photoconductor on the illumination energy. Qualitatively, the characteristics KLB, KL1 and KL2 have a similar curve, so that only the curve of the characteristic KLB shall be explained below. With increasing illumination energy, the values of potential on the photoconductor drop according to a descending exponential function until a lowest obtainable discharge potential VLIM is finally reached, illustrated with a broken line 54.

The printing event leads to print images with high print quality when the potentials that are generated upon occurrence of the various light encoding values 0, 1, 2 or, respectively, 3 have an approximately uniform spacing from one another and are distributed over the entire discharge region that is available. However, only potentials in the upper region of the discharge curve are taken into consideration in the following explanation in order to simplify the explanations. No illumination is carried out given the light encoding value 0, so that the charge potential VC is retained. The potential V1=450 V, for example, should be generated given the light encoding value 1. A potential V2=400 V or, respectively, V3=350 V should be generated given the light encoding value 2 or, respectively, 3. On the reference characteristic KLB, the illumination energy H1 belongs to the potential V1, the illumination energy H2 belongs to the potential V2 and the illumination energy H3 belongs to the potential V2.

Figure 3:
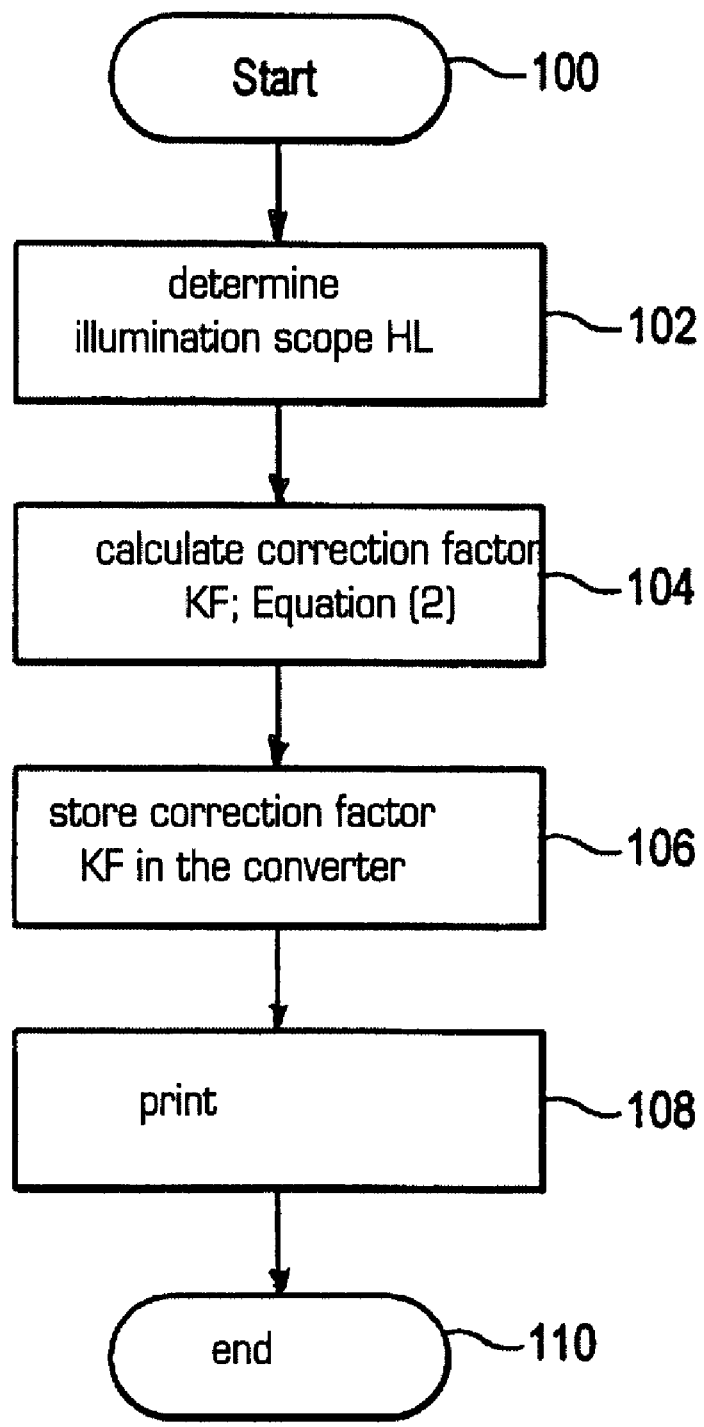
FIG. 3 is a flowchart with method steps of a balancing event.

FIG. 3 shows a flowchart for a first exemplary embodiment of the balancing event. FIG. 2 is also referenced in the explanation of FIG. 3. The balancing event begins after the activation of the printer in a step 100. For determining the correction factor KF, the current illumination scope HL of the photoconductor is acquired in a step 102 in that the photoconductor is initially charged to the charge potential VC. Subsequently, the illumination energy is raised step-by-step until a balance potential VA to which the following applies is acquired:

$$VA=|VC|-0.95|VC-VLIM| \quad (1)$$

The illumination scope H1 is thus defined as the illumination energy HL at which the photoconductor is 95% discharged. The illumination scope HL of the photoconductor with the characteristic KLB is a reference illumination scope HLB. An illumination scope HL1 belongs to the characteristic KL1.

In step 104, the correction factor KF is calculated according to the equation:

$$KF = \frac{HL1}{HLB} \quad (2).$$

The correction factor amounts to approximately 0.6 for the characteristic KL1. This means that the illumination energies H1, H2 or, respectively, H3 for the light encoding values 1, 2 or, respectively, 3 are respectively multiplied by the correction factor KF=0.6. To that end, as already explained above, the auxiliary parameters for the balancing of the light-emitting diodes to the same brightness are multiplied by the correction factor KF in the conversion and correction unit 24 and are stored, see step 106. When printing in step 108, light energies H1a, H2a or, respectively, H3a arise that are employed instead of the illumination energies H1, H2 or, respectively, H3. The illumination energies H1a, H2a and H3a also lead to the potentials V1, V2 or, respectively, V3 given employment of a photoconductor with the characteristic KL1 and, thus, to a high-quality print image. The method is ended in a step 110. The steps 100 through 110 are run upon employment of a microprocessor.

An illumination scope HL2 that is greater than the reference illumination scope HLB would be correspondingly determined given a photoconductor with the characteristic KL2. The correction factor KF is therefore greater than 1, for example 1.4, so that the illumination energy H1 is increased to a value H1b (not shown). The illumination energy H2 is likewise increased to an illumination energy H2b or, respectively, the illumination energy H3 is increased to an illumination energy H3b.

Despite the non-linear characteristics KL1, KLB and KL2, the correction with only one correction factor KF leads to adequately exact settings of the illumination energies allocated to the light encoding values 1, 2 and 3.

In a second exemplary embodiment, an illumination energy HE is determined that discharges the photoconductor to a balance potential VEA that lies about in the middle between the charge potential VC and the discharge potential VLIM. After being charged to the charge potential VC, the photoconductor is more and more intensely illuminated in steps until the balance potential VEA is acquired. The value of the illumination energy HE is then employed as a correction factor KF. The illumination energy HE1 to be set derives for the characteristic KL1, this lying by about the factor 0.6 below an illumination energy HE whereat the balance potential VEA occurs on the reference photoconductor with the characteristic KLB. An illumination energy HE2 to be set derives for the characteristic KL2, this lying above the illumination energy HE by approximately the factor 1.4.

It is assured in a calibration event at the factory that, given a correction factor KF=HE, the character generator is driven with a current that leads thereto that the character generator outputs an illumination energy that results in the potential VEA at the reference photoconductor with the characteristic KLB. The value HE1 is employed as a correction factor given the characteristic KL1 and the value HE2 is employed given the characteristic KL2. The illumination energies for the light encoding values 0 through 3 are co-set in this balancing event because the setting of the current for the drive of the character generator 22 influences all illumination energies in the same relationship.

FIG. 4 shows equations (1), (2) and (3) that are employed in a third exemplary embodiment in the determination of the correction factor KF. The equations (1), (2) and (3) are explained below, likewise with reference to FIG. 2. Equation (1) reads:

$$VD(K,T,H)=(VC-VLIM)\cdot\exp(-K\cdot T\cdot H)+VLIM, \quad (1)$$

whereby

VC is the charge potential of the photoconductor in volts,

VD is the discharge potential of the photoconductor in volts,

VLIM is the lowest obtainable discharge potential in volts,

H is the illumination energy in $\mu Ws/cm^2$,

T is the currently acquired temperature of the photoconductor in ° C.,

K is the photoconductor class in $cm^2/(\mu Ws° C.)$, and exp is the exponential function.

Equation (1) is an approximation for the respective characteristic of the photoconductor. The characteristics KLB, KL1 and KL2 in FIG. 2 differ from one another on the basis of the photoconductor class K. Equation (2) arises by reformulating Equation (1) according to the photoconductor class K:

$$K(VD, T, H) = \frac{1}{T \cdot H} \ln\left(\frac{VC - VLIM}{VD - VLIM}\right), \quad (2)$$

whereby ln is the logarithm function.

When a standard illumination energy HS is prescribed for the illumination energy H and, following illumination of the photoconductor with this illumination energy HS, the arising discharge potential VD as well as the temperature T of the photoconductor are acquired, then all quantities on the right side of Equation (2) are known and the photoconductor class K can be calculated. Alternatively, tables can be employed wherein photoconductor classes K calculated once for specific values of VD, T and H are stored.

When Equation (1) is reformulated according to the illumination energy H, then Equation (3) derives:

$$H(VD, K, T) = \frac{1}{T \cdot K} \ln\left(\frac{VC - VLIM}{VD - VLIM}\right), \quad (3).$$

After the photoconductor class K has been determined, the potentials VEA is inserted for the discharge potential VD. Prepared tables can thereby be employed in order to implement the determination of the corrected illumination energies HE1 or, respectively, HE2 fast. Given a corresponding calibration of the character generator, for example, the value of the illumination energy HE1 is employed as value of the correction factor.

Although other modifications and changes may be suggested by those skilled in the art, it is the intention of the inventor to embody within the patent warranted hereon all changes and modifications as reasonably and properly come within the scope of their contribution to the art.

What is claimed is:

1. A method for printing with a character generator, comprising the steps of:
    illuminating a photoconductor with at least one light source of an optical character generator;
    generating light encoding data from print data of a print image;
    allocating at least three different light encoding values contained in said light encoding data to different illumination energy values;
    prescribing a balance potential to be set on the photoconductor for a balance event;
    acquiring an illumination energy producing the prescribed balance potential on the photoconductor as a balance illumination energy;
    modifying the illumination energy values to be generated by the optical character generator given the different light encoding values in a same relationship dependent on the acquired balance illumination energy; and
    determining a degree of modification by a deviation of the balance illumination energy from a reference illumination energy that generates the balance potential given employment of a reference photoconductor with a predetermined discharge characteristic.

2. A method as claimed in claim 1, further comprising the steps of:
    determining a correction factor that is a criterion for deviation of the current characteristic of the photoconductor from the predetermined discharge characteristic; and
    modifying the illumination energy values with assistance of the correction factor.

3. A method as claimed in claim 2, wherein said step of determining the correction factor sets the correction factor for the character generator by one of division from the acquired balance illumination energy and the reference illumination energy and from the acquired balance potential and the reference potential.

4. A method as claimed in claim 2, further comprising the step of:
    utilizing one of the acquired balance illumination energy and the acquired balance potential as a correction factor for setting of the character generator.

5. A method as claimed in claim 2, further comprising the step of:
    modifying a current for driving the at least one light source of the character generator depending on the correction factor.

6. A method as claimed in claim 2, further comprising the step of:
    modifying an on time duration of the at least one light source dependent on the correction factor.

7. A method as claimed in claim 1, wherein an amount of one of the balance potential and an acquired balance potential deviates by less than 100 volts from an amount of the discharge potential of the photoconductor.

8. A method as claimed in claim 1, wherein the amount of one of the balance potential and the acquired balance potential lies no more than 50 Volts from an average of an amount of a discharge potential of the photoconductor and an amount of the discharge potential.

9. A method as claimed in claim 1, further comprising the step of:
    utilizing an approximation for a characteristic of the photoconductor for determining the deviation.

10. A method as claimed in claim 9, wherein the following approximation is employed:

$$VD(K,T,H) = (VC - VLIM) \cdot \exp(-K \cdot T \cdot H) + VLIM, \quad (1)$$

whereby
    VC is the charge potential of the photoconductor in volts,
    VD is the discharge potential of the photoconductor in volts,
    VLIM is the lowest obtainable discharge potential in volts,
    H is the illumination energy in $\mu Ws/cm2$,
    T is the currently acquired temperature of the photoconductor in $°$ C.,
    K is the photoconductor class in $cm2/(\mu Ws° C.)$, and
    exp is the exponential function.

11. A method as claimed in claim 1, further comprising the step of:
    utilizing an approximation for a characteristic of the photoconductor for determining the correction factor.

12. A method as claimed in claim 1, wherein the balancing event is automatically implemented.

13. A method as claimed in claim 12, wherein said automatic implementation is one of after a printer or copier device is turned on and after longer printing pauses and after longer printer operation and on demand of an operator.

14. A method as claimed in claim 1, wherein the discharge characteristic of the reference photoconductor is permanently prescribed.

15. A method as claimed in claim 14, wherein said permanent prescription is independent of modifications due to aging or modified ambient conditions in the printing process.

16. A printer or copier device, comprising:

a print data unit that generates light encoding data having one of at least three different light encoding values from print data of a print image;

a multi-level character generator that is driven with the light encoding data and emits a predetermined illumination energy dependent on the respective light encoding value;

a photoconductor that is discharged by the illumination energy output by the multi-level character generator;

a balancing device that in an automatic balance event modifies the illumination energies emitted by the character generator at different light encoding values in a same relationship;

a controller for a balance event to prescribe a balance potential to be set on the photoconductor;

a sensor to acquire the illumination energy producing a predetermined balance potential on the photoconductor as a balance illumination energy;

said character generator modifying the illumination energy values generated by the same generator given the various light encoding values are modified by the balance device in the same relationship dependent on the acquired balance illumination energy, and the degree of the modification is determined by the deviation of the balance illumination energy from a reference illumination energy that generates the balance potential given employment of a reference photoconductor with a predetermined discharge characteristic.

* * * * *